United States Patent [19]

Burges

[11] Patent Number: 5,519,788
[45] Date of Patent: May 21, 1996

[54] ALPHANUMERIC IMAGE SEGMENTATION SCHEME

[75] Inventor: Christopher J. Burges, Freehold, N.J.

[73] Assignee: AT&T Corp., Murray Hill, N.J.

[21] Appl. No.: 505,039

[22] Filed: Jul. 21, 1995

Related U.S. Application Data

[63] Continuation of Ser. No. 326,640, Oct. 11, 1994, abandoned, which is a continuation of Ser. No. 225,361, Apr. 8, 1994, abandoned, which is a continuation of Ser. No. 816,414, Dec. 31, 1991, abandoned.

[51] Int. Cl.$^6$ ................................................ G06K 9/00
[52] U.S. Cl. ............................................................ 382/173
[58] Field of Search ................................. 382/119, 173, 382/155, 209, 218, 282

[56] References Cited

U.S. PATENT DOCUMENTS 5,027,414  6/1991  Hilton ........................................ 382/13
5,101,439  3/1992  Kiang ........................................ 382/13

*Primary Examiner*—Jose L. Couso
*Attorney, Agent, or Firm*—Charles E. Graves; Martin I. Finston

[57] ABSTRACT

A process for creating segments out of an arbitrary string of handwritten alphanumeric script is described, in which the contours of the image are defined by the path a ball or pointer follows when allowed to roll from the top and bottom of an image, down or up either side. From the contours, the initial image cut points are determined. The pointer is provided with a capability to measure ink density in the nearby pixels. A grey scale threshold control is provided which operates in conjunction with the pointer as it rolls or moves, to define ink density above the threshold as a white pixel wherein no image content is present; and ink density below the threshold as a black pixel wherein image content is present.

9 Claims, 2 Drawing Sheets

ALPHANUMERIC IMAGE SEGMENTATION SCHEME

GOVERNMENT INTEREST

This invention was funded under a governmental contract awarded by the United States Postal Service, No. 104230-90-C-2456.

This application is a continuation of application Ser. No. 08/326,640, filed on Oct. 11, 1994 now abandoned which is a continuation of application Ser. No. 08/225,361, filed on Apr. 8, 1994 now abandoned, which is a continuation of application Ser. No. 07/816,414, filed on Dec. 31, 1991 now abandoned.

FIELD OF THE INVENTION

This invention relates to recognition machines and, particularly, to a novel process in such machines for preparing an image or pattern, particularly an unknown alphanumeric character, for presentation to the recognizer.

BACKGROUND OF THE INVENTION

An important step in the manipulation of image data preparatory to invoking the recognition step is to subject the image to segmentation. If the image is one or more unknown handwritten characters, the segmentation process makes slices or cuts of the image thus to divide the image into its correct individual characters.

Because of the great variability of individual handwriting styles, prior art segmentation schemes which merely make a few straight cuts at the unknown image are ill-adapted to generate the "correct" cuts in a sufficiently high percentage of cases. At the other extreme, segmentation schemes which make many arbitrary cuts at an unknown string of handwritten script letters can create so large a number of sub-images (hereinafter, "cells") that the recognition engine is significantly overtaxed with having to make calculations. The result in the first case is an unacceptably low correct recognition rate, and in the second case it is a slowing of the speed of recognition.

An additional consideration in determining an optimum segmentation scheme for segmenting handwritten script is the presence of gray scale in much if not most real-life script. Grey scale further complicates making the segmentation cuts because the extent of grey in any given image can be subtle or on the other hand quite pronounced. Further, the interaction of grey scale with other attributes of script such as character overlap and slant is also very variable.

OBJECTS OF THE INVENTION

Accordingly, one object of the invention is to increase the recognition speed of an alphanumeric symbol recognition engine.

A general object of the invention is to automatically recognize handwritten alphanumeric script more rapidly and at the same time more accurately in real time.

A specific object of the invention is to provide a process for segmenting an unknown handwritten script image which requires as few segmentation cuts as possible while at the same time maximizing the probability that the "correct" segment cuts are made.

A further specific object of the invention is to effectively determine the cut points in a string of script letters in the presence of grey scale.

SUMMARY OF THE INVENTION

The invention is a new and useful approach to creating segments out of an arbitrary string of handwritten alphanumeric script. The unknown image is converted to a 20 X N pixel format, where N is chosen to maintain a predetermined aspect ratio.

In accordance with the invention, following deskewing, clipping and normalizing steps, the upper and lower contours of the images are determined. These contours are, in effect, the path a ball (the "pointer" below) would follow if forced to roll from the top (and bottom) of an image, down (and up) either side. Next, the contour information is smoothed. Then, the initial cut points are determined. Advantageously, these points are more than some predetermined minimum distance apart.

The pointer is provided with a capability to measure ink density in the nearby pixels. A grey scale threshold control is provided which operates in conjunction with the pointer to define ink density above the threshold as a white pixel (no image content present), and ink density below the threshold as a black pixel (image content present).

The travel of the pointer along its path outlines in brush-stroke fashion the contour of the image. Stationary in its initial pixel position, the pointer points down to the next-adjacent pixel in the down direction and measures the ink density. If that pixel is below the set threshold, the pointer travels down to that pixel. If the pointed-to pixel is at or above the threshold, the system generates two further measures, a value comparison of which controls the pointer to move either one pixel to the left or one pixel to the right. If the comparison reveals an equivalence, the pointer is moved one pixel down.

The invention also provides a process for removing colliding cuts and for further cut reduction. With the completion of the cuts, the construction of the cells is complete, and the cells then may be analyzed to minimize the calls to a recognizer in the manner described in the patent application filed on Dec. 31, 1991, Apr. 8, 1994, and Oct. 11, 1994, herewith by C. J. Burges et al., Ser. Nos. 07/816,415 now abandoned, 08/227,082 now abandoned, and 08/327,339, and assigned to the Applicants' assignee.

While the invention is applicable to a neural network alphanumeric symbol recognizer, workers in the art will appreciate that the inventive scheme for making cuts of an alphanumeric image may be practiced in many other types of pattern recognition systems.

The invention and its further objects, features, and advantages are more fully presented below.

DETAILED DESCRIPTION OF AN ILLUSTRATIVE EMBODIMENT

The invention will be illustrated in an example in which a 5-digit handwritten zip code script is segmented. It should be understood, however, that the invention is equally applicable to general script handwriting as well as to many types of other images, both symbolic and nonsymbolic.

Figure 1:
FIG. 1 is an image of a zip code script, which has a characteristic slant.

FIG. 1 shows an image of a zip code script, which has a characteristic slant. This image first is de-slanted or deskewed, by any of many available processes.

Figure 2:
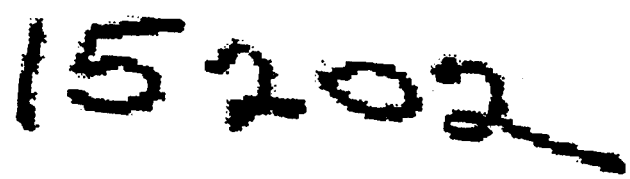
FIG. 2 is the image of FIG. 1 after de-slanting and deskewing.
Figure 3:
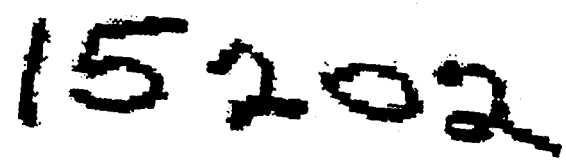
FIG. 3 is the image of FIG. 2, with a tail removed.

The resulting deskewed image is depicted in FIG. 2. That image will be noted to include a long "tail" on the number "2" in the fifth or far-right position. By any of several techniques for clipping extensions such as the tail on the "2", that tail is removed, resulting in the image of FIG. 3. One such clipping technique is to utilize the upper and lower contours of the images, which is described below.

Next, the image is normalized to a 20 X N pixel image, where N is chosen to maintain the aspect ratio. In this example, the convention is that pixel values range from −1, connoting background or white space, to +1 connoting black ink, with intermediary values (such as +0.8) connoting a density of ink in the grey scale range.

Figure 4:
FIG. 4 is a trace of the upper contour of the image of FIG. 3.
Figure 5:
FIG. 5 is a trace of the lower contour of the FIG. 3 image.
Figure 6:
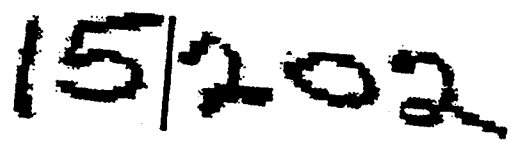
FIG. 6 is an illustrative specific cut of the image of FIG. 1, at a definite cut point.

It will be noted that the digits of FIG. 1 contain substantial grey scale, which the invention accommodates to in the manners now to be described. The upper and lower contours of the images are next determined. As noted, the contours are the trace of a path a relatively small diameter ball follows when rolled along the edge of the image, as it were, under the influence of gravity. FIG. 4 illustrates the upper contour of the image of FIG. 3 thus created, and FIG. 5 represents the lower contour of the FIG. 3 image. These contours are computed by conventional pixel image processing well-known to workers in the art.

The contours are used to clip the sides of the images so as to remove any recursive strokes which, for example, may arise from the presence of other fields in the address image and which intrude at either end of the zip code image. The contours are also used as a mechanism to clip any long "tails" present on the digits at the end of the zip code image.

The clipping is done by computing the difference between the upper and lower contours at the left and right edges of the image. If the difference is below a user-set threshold, that part of the image is removed. The next pixel into the image is then treated in the same way. This process continues until the difference between upper and lower contours exceeds the predetermined threshold, in which case a few of the images are replaced in order to avoid overclipping the image.

Next, in accordance with the invention, definite cuts in the image are identified. In this illustration, a definite cut is determined by considering whether the image contains three or more pixel columns of white space, that is, space in which no black or grey-scale pixel images are present. When this circumstance is detected, then the white space is shrunk to just three columns, and the center column of the three is defined as a "definite cut".

Next, the image is divided into some number of cells. The object is to construct a segmentation of the image with as few cells as possible, yet such that the correct segmentation is contained in some combination of the cells.

The number of cells generated depends on the nature of the image. One way to construct and then process the cells is explained in the cited patent applications of C. J. Burges et al., Ser. Nos. 07/816,415, 08/227,082 and 08/327,339.

An advantageous way to divide the image into cells is to compute some number of the lowest points in the upper contour of FIG. 4. In order to get sensible initial cut points, the contours are first smoothed using, for example, a conventional Gaussian kernel known to workers in the art.

Preferably also, the cut points are selected to be spaced apart by more than a minimum distance which may be determined by the user.

The number of cut start points chosen is specific to the nature of the image. In general, whether the image is a five-digit zip code as in the present illustration, or some other image, the number of cut starting points advantageously is derived from the aspect ratio of the image.

Figure 7:
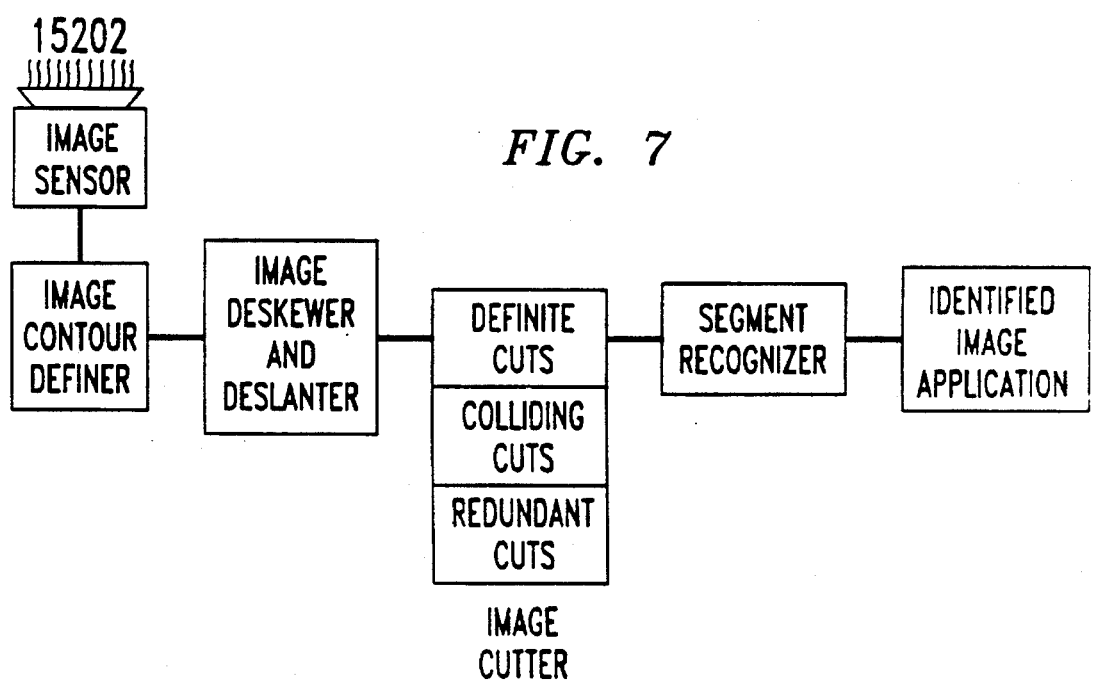
FIG. 7 is a high-level schematic block diagram of apparatus for practicing the invention.

The pointer, illustrated as a mechanism in FIG. 7, advantageously is provided with the capability to measure ink density in pixels nearby to those to which it is pointing. A grey scale threshold control is provided which operates in conjunction with the pointer to define ink density above the threshold as a white pixel (no image content present), and ink density below the threshold as a black pixel (image content present).

In accordance with a key aspect of the invention, a prior art algorithm known as "hit or deflect" and described in an article by R. Fenrich and S. Krishnamoorthy appearing in the USPS Advanced Technology Conference Proceedings 1990, Vol. 1, is modified to provide both more sensitivity and more adaptability to grey scale. That article is hereby incorporated by reference.

The modified algorithm of the present inventive process will be understood by referring to the cited article in conjunction with the following explanation. Let it be assumed that the pointer is stationed at some determined point in its scanning of the image of FIG. 1, and further, that a "cut" is being dropped from the top of the image. In this example, pixel values range from −1 connoting background or white space, to +1 which is "black ink" pixel imagery.

The first step is to point the pointer down to the next-adjacent pixel in the down direction and measures the ink density. If that pixel is below the set ink density threshold, the pointer is directed to move down one pixel. If, however, the pointed-to pixel is at or above the said then the following quantities are calculated:

left ink=ink in pixel to the left+ink in pixel one pixel down and one pixel to the left; and right ink=ink in pixel to the fight+ink in pixel one pixel down and one pixel to the fight.

Next, an ink gradient is defined:

ink gradient=(left ink)−(right ink);

then, if (a) ink gradient>gradient threshold, the pointer is moved one pixel to the right;

if (b) ink gradient<−gradient threshold, the pointer is moved one pixel to the left;

else, if neither (a) nor (b) are satisfied, the pointer is moved one pixel downward.

It is possible that the method as described above can become stuck in an oscillatory mode. This possible situation may be avoided by considering that if the last step was to the left and the next step of the above process is to be to the right, then the said last step is "erased" or cancelled and the pointer is moved one pixel down.

Practice of the above process often results in the generation of cuts that collide or overlap. To avoid this result, it is useful to invoke a conventional recursive algorithm to replace two cuts that collide with a single cut, which advantageously may be the straighter of the two collided cuts.

The preceding cutting may result in some cuts which are disadvantageous to the efficiency of the overall process.

These cuts may be removed in accordance with another aspect of the invention in the following additional processing steps.

1. The height of the above-ink threshold region between the two cuts noted above is calculated. If the calculated height is above a second threshold, determined by the user, then the associated segment is flagged as "good." If not, the segment is flagged as "bad."

2. If both of the above cuts are definite (wherein "definite" is defined in accordance with the earlier statement) then both of the cuts are returned or retained.

3. Else, if only one of the cuts is definite, then only that cut is returned.

4. Else, if the segment contains only background, and if one of the cuts is at the edge of the image, then return that edge cut, or else return the straighter of the two cuts.

5. Else, move the pointer in a "crawl" down each cut to see if the pointer crosses a line; if one cut of the pointer crosses a line and the other does not, then return only the cut that does not cross a line.

6. Else, if neither cut of the pointer crosses a line, remove both cuts.

7. Else, if both cuts cross a line and that crossed line is more than ⅓ of the distance from the top of the image to its bottom, return the cut to the immediate right of the image.

8. Else, return both said cuts.

It will be noted that even if both cuts are removed as a result of the preceding steps, the associated cell may still be "flagged" as bad, so that the cell can automatically be given a low score and so that the recognizer need not be called for that cell. Thus flagging the cell as "bad" has the advantage of reducing the number of calls to the recognizer and further, reducing possible false positive identifications in the reading of the image.

Cases in which digits are connected at the top are missed by the above process can be solved by sending a small number of cuts up from the bottom of the image. Start points for these bottom cuts are computed from the intersection of the top cuts already generated, with the bottom of the image. Cuts then are sent up from the three widest such intervals. The colliding cuts processing described above may then be invoked. If the set of cuts which remain thereafter contain more cuts that were generated from the top, the "further cut reduction" process described above is applied again.

The construction of the segment cells is now complete, and a segmentation graph such as described in the cited Burges et al patent application may now be constructed.

I claim:

1. A method for processing a graphical record bearing a character string for automatic reading by a character recognition machine, the method comprising:

a) with an image sensor, digitizing the graphical record, thereby to form a pixel image of said record, wherein each pixel of said image assumes one of a plurality of grey-scale values, each said grey-scale value corresponding to a measured ink density of said record;

b) in a pixel-image processor, defining an upper contour and a lower contour of the character string;

c) in said processor, segmenting the character string into individual cells by downwardly extending at least one cut path to the lower contour from a selected start point on the upper contour; and d) transmitting the resulting, individual cells from said processor to a character-recognition machine;

e) wherein, during the segmenting step, the cut path is extended by moving a pointer downward, but if a white pixel does not lie directly below the present position of the pointer, then preferentially toward pixels of decreasing ink density lying below and to the side of said present position.

2. The method of claim 1, wherein, in the pointer-moving step, a white pixel is defined as a pixel having a grey-scale value less than a predetermined threshold.

3. The method of claim 1, further comprising, before the contour-defining step, the step of deskewing the character string.

4. The method of claim 1, further comprising, before the contour-defining step, the step of making one or more definite vertical cuts through vertically contiguous white space within said string, thereby to segment at least some adjacent characters of said string.

5. The method of claim 1, wherein one ore more start points for cut paths are selected by locating along the X-scale of said pixel image the vertically lowest points reached by said upper contour as measured from the contour top, the intersection of the vertical line associated with each said lowest point and said contour top defining a start-cut pixel.

6. The method of claim 1, wherein the cut-path extending step comprises:

locating at each start-cut pixel a pointer capable of measuring pixel ink density;

moving each said pointer down to the next-adjacent vertical pixel;

measuring with said pointer the ink density of each pixel neighboring to said next-adjacent vertical pixel;

comparing said measured ink density in each case with said grey-scale threshold;

if said next-adjacent pixel is determined to be located in between character space, moving said pointer down one further pixel;

if instead said next-adjacent pixel is determined to contain character image, probing said pointer to further pixels in the vicinity of said measured pixel, calculating ink density gradients for each said pointer probe and moving said pointer to the nearby pixel associated with the smallest measured ink gradient;

all said pointer movements tracing a continuous cut path beginning from each respective said start-cut pixel;

continuing moving and probing said pointer accordingly until all continuous cut paths from each said start-cut pixel are made through said string;

said definite vertical cuts together with said continuous cut paths thereby segmenting said character string into its respective discrete characters.

7. The method of claim 6, comprising the further step of clipping the sides of said pixel image string by:

computing the vertical difference between said upper and said lower contour in the vertical direction beginning at the right and left outer edges; and removing from said pixel image those pixels for which said difference is below a predetermined threshold value.

8. The method of claim 7, further comprising:

scanning said pixel image with said pointer to locate any groups of adjacent vertical all-white pixel columns; and eliminating all said white pixel columns except the middle column of each said group, said middle column constituting a said definite vertical cut.

9. The method of claim 8, further comprising:

setting a threshold for the horizontal separation between adjacent cut paths; and reducing to a single cut path each pair of cut paths that are horizontally separated by less than said threshold.

\* \* \* \* \*